April 8, 1952  N. E. RISK ET AL  2,591,873
OVER CENTER CAM ENGAGED CLUTCH
Filed Jan. 23, 1948  3 Sheets-Sheet 1
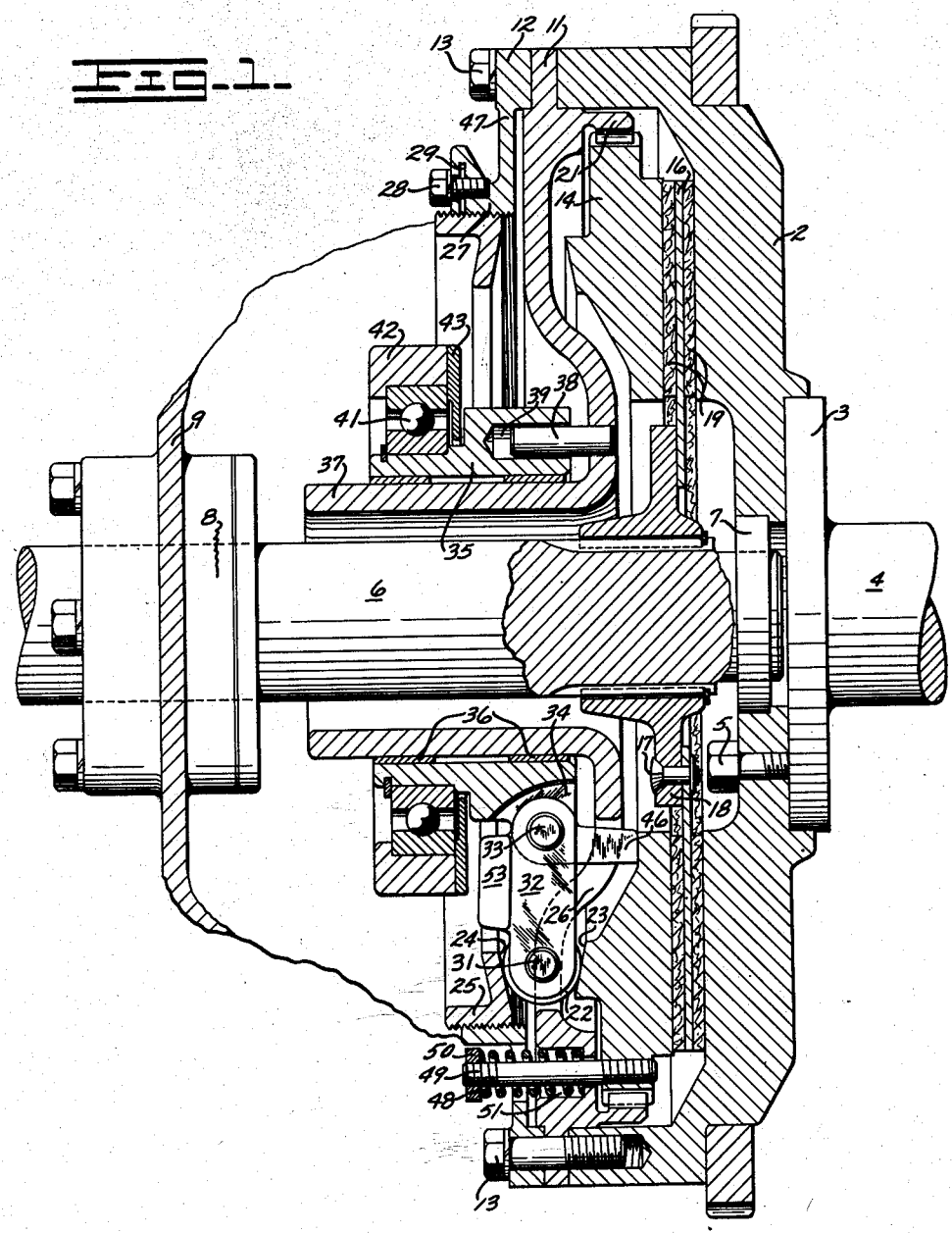
INVENTORS.
Norman E. Risk
Charles A. Ramsel
BY Russel C. Williams
Charles M. Fryer
ATTORNEY.

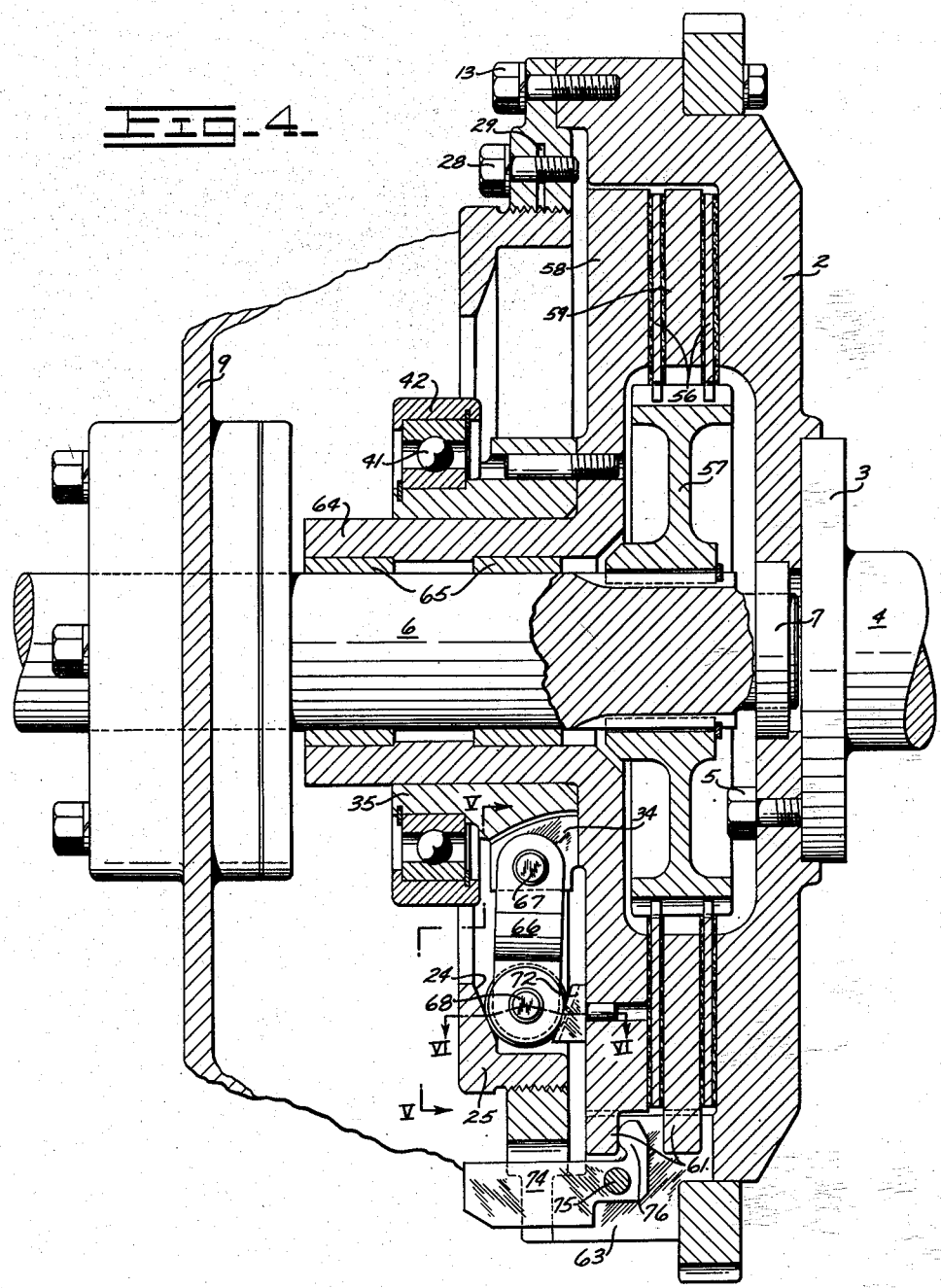

April 8, 1952  N. E. RISK ET AL  2,591,873
OVER CENTER CAM ENGAGED CLUTCH
Filed Jan. 23, 1948  3 Sheets-Sheet 3
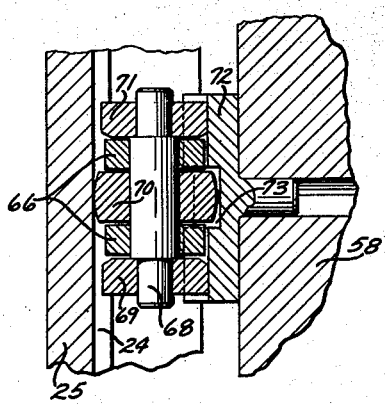
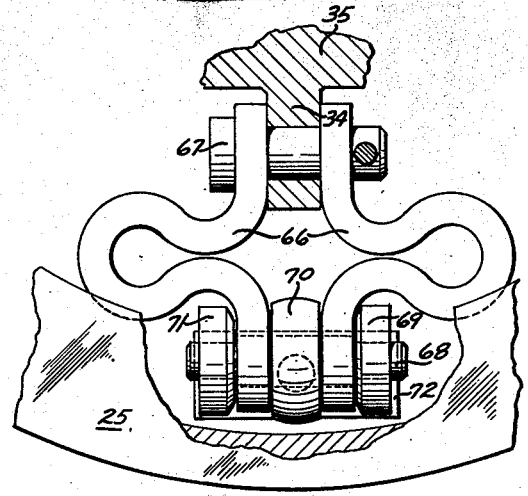
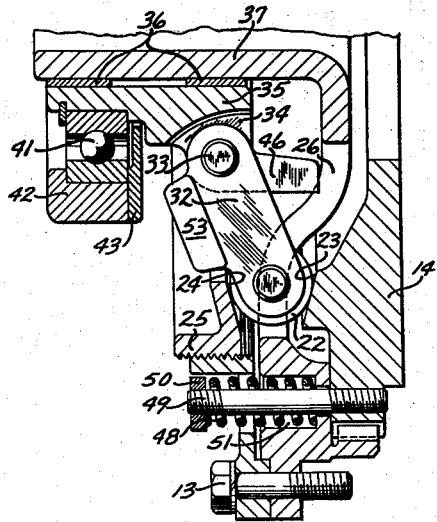
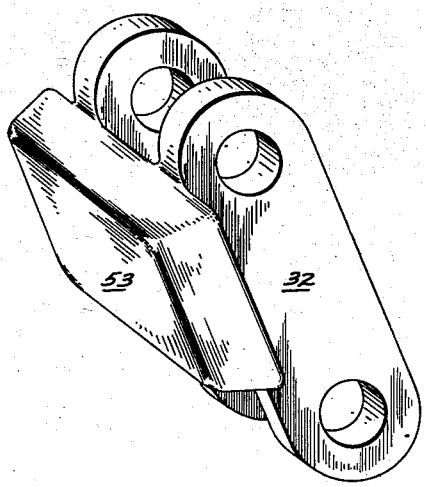
INVENTORS.
Norman E. Risk
Charles A. Ramsal
BY Russell C. Williams
Charles M. Fryer
ATTORNEY.

Patented Apr. 8, 1952

2,591,873

UNITED STATES PATENT OFFICE 2,591,873

OVER CENTER CAM ENGAGED CLUTCH

Norman E. Risk, Charles A. Ramsel, and Russell C. Williams, Peoria, Ill., assignors to Caterpillar Tractor Co., Peoria, Ill., a corporation of California Application January 23, 1948, Serial No. 3,866

2 Claims. (Cl. 192—93)

This invention relates to clutches in general and more particularly to main drive clutches such as are employed between the engine and a transmission of a tractor or like vehicle.

In clutches of this type it is desirable to have the overall length of the clutch mechanism as short as possible in order to conserve space. It is also important to permit ready access for servicing and adjustment of the clutch, as well as to provide some means of warning the operator when the clutch is in need of adjustment.

It is therefore an object of the present invention to provide a clutch of improved light weight construction adapted to be supported by the flywheel of an internal combustion engine or the like. It is another object of this invention to provide a means for effecting engagement of a clutch by wedge action and to provide novel means associated with the wedge action to reduce friction to a minimum. A further object is to provide centrifugally actuated means tending to hold the clutch in disengagement and serving also as an indicator of wear on the clutch discs.

Further objects and advantages of the invention are made apparent in the following description wherein reference is made to the accompanying drawings.

In the drawings:

Fig. 1 is a vertical sectional view of a clutch embodying this invention;

Fig. 2 is a fragmentary sectional view of a portion of the clutch shown in Fig. 1;

Fig. 3 is an isometric view of one of the engaging links shown in Fig. 1;

Fig. 4 is a vertical view of a modified form of this invention;

Fig. 5 is an enlarged fragmentary sectional view taken along the line V—V of Fig. 4; and Fig. 6 is an enlarged fragmentary sectional view taken along the line VI—VI of Fig. 4.

The general arrangement of a clutch embodying the present invention is illustrated as being associated with an internal combustion engine. In Fig. 1 of the drawings a flywheel 2 is shown as secured to a flange 3 of an engine crankshaft 4 by means of capscrew 5. A driven shaft to which power is transmitted by the clutch is illustrated at 6 as having one end journalled in a bearing 7 disposed in a centrally located recess in the flywheel and also as being supported in a bearing 8 disposed in a housing 9 enclosing the clutch. The extending end of the driven shaft may be connected to any suitable power absorbing mechanism such as a vehicle transmission (not shown).

Substantially the entire weight of the clutch is carried by the flywheel and it is for this purpose that a plate 11 and a collar 12 are both secured to the flywheel by means of cap screws 13.

The flywheel is of a hollow or cupped construction for the reception of a pressure plate 14 and a clutch driven disc 16. The driven disc is rigidly secured as by rivets 17 to a hub 18 splined for sliding movement on the shaft 6. The opposite faces of the disc 16 are preferably covered with a frictional surfacing material such as is illustrated at 19.

An inwardly extending annulus 21 is formed integrally with the supporting plate 11, forming a cup-like chamber for the reception of the pressure plate 14. The inner circumference of the annulus 21 is toothed to mesh with teeth formed on the periphery of the pressure plate. By virtue of this toothed or splined connection, the pressure plate is supported by and rotated with the supporting plate 11 but is free to be moved axially to effect engagement and disengagement with the driven disc 16. Such axial movement is effected by urging rollers 22 between a pair of opposed and relatively inclined ramps 23 and 24. The inclined ramp 23 is formed integrally with the pressure plate 14 and the ramp 24 is formed as a part of an adjustable collar 25. Both ramps are annular in shape and are disposed concentrically with relation to the main axis of the clutch. There are a plurality of rollers 22 spaced equally throughout the circular space between the opposed ramps. Suitably spaced openings 26 are provided in the supporting plate 11 to accommodate the rollers in their positions between the inclined ramps 23 and 24. The adjustable collar 25 is threaded into a rearwardly extending hub portion 27 formed integrally with the clamping collar 12. The collar 25 is adjustable with relation to the hub 27 by virtue of its threaded connection therewith. A capscrew 28 extending through a split portion 29 in the hub 27 serves to secure the collar 25 in its adjusted position.

Each of the rollers 22 is journalled about a pin 31 supported in one end of a bifurcated link 32 (see also Figs. 2 and 3). The opposite end of the link is pivotally connected by means of a pin 33 to a radially extending ear 34 formed integrally with a sliding collar 35. The sliding collar 35 is supported on a pair of spaced bearings 36, such bearings being journalled about an extended hub portion 37 formed integrally with the supporting plate 11. A pin 38 is rigidly secured to the plate 11, and its extending end is received in a recess 39 provided in the sliding collar. By virtue of this connection the sliding collar is rotated with the plate 11 and at the same time permitted to move axially with relation thereto. Disposed about the sliding collar is a clutch throwout bearing 41, the inner race of which is rigidly secured to the sliding collar, while the outer race is retained in a sliding yoke 42 by means of a retainer plate 43.

The yoke 42 is connected to any suitable actuating mechanism (not shown) which permits the operator to engage and disengage the clutch by moving the sliding collar toward and away from the flywheel. Movement of the sliding collar 35 toward the flywheel forces the rollers 22 outwardly between the ramps 23 and 24. This results in the pressure plate 14 being moved toward the flywheel into frictional engagement with the driven disc 16.

In order to retain the clutch in the engaged position the links 32 are moved to an overcenter position, such as is illustrated in Fig. 1 of the drawings. Further movement of the sliding collar toward the flywheel is limited by a number of fingers, one of which is illustrated at 46. The fingers 46 are formed integrally with the sliding collar 35 and extend through the apertures 26 terminating in a position to abut the pressure plate 14. Movement of the links 32 to their overcenter positions is permitted by a relatively long thin walled section 47 provided in the collar 12 which section affords sufficient resiliency to permit the overcenter action of the rigid links and at the same time to insure even bearing of the pressure plate on the driven discs 16.

When the clutch is moved to a disengaged position, such as is illustrated in Fig. 2 of the drawings, the pressure plate is urged away from the flywheel by means of a number of radially spaced springs, one of which is illustrated at 48. Each spring circumscribes a stud 49 having a threaded connection with the pressure plate 14 and is interposed between a retainer 50 threaded to the stud and a shoulder formed at the end of a recess 51 in the supporting plate 11.

As is best illustrated in Figs. 2 and 3 of the drawings, a counterweight 53 forms a part of each of the links 32. The presence of the counterweight 53 so disposes the center of gravity of the link assembly that as the result of centrifugal force the assembly urges the clutch toward the disengaged position. The counterweights 53 not only serve to urge the clutch to the disengaged position but may be of such a size as to cause the clutch automatically to disengage when wear on the clutch plates reaches a predetermined point. This will occur because as the clutch plates wear the distance between the ramps 23 and 24 becomes greater until the rollers 22 are permitted to swing away from their overcenter position under centrifugal force. This is of particular advantage in that it prevents the operator from employing the clutch when it is in need of adjustment. The manner in which the clutch when worn or poorly adjusted is thrown out of engaged position may best be understood by reference to Fig. 1 wherein the clutch is shown engaged and the weights 53 are creating a centrifugal force tending to swing the links 32 toward the right. Because the links are in overcenter position with the centers 31 of the rollers advanced leftward with respect to the pivots 33, the rightward swinging movement of the links must be accompanied by a slight downward movement of the roller 22 which would, of necessity, spread apart the ramps 23 and 24. If the clutch is properly adjusted, this force created by the counterweights 53 is insufficient to spread the ramps apart. However, if the friction discs have worn, the resistance to spreading of the ramps 23 and 24 is less and the weights 53 will function to disengage the clutch.

Fig. 4 of the drawings illustrates a modified form of this invention in its application to a multiple plate clutch in which parts corresponding to those shown in Fig. 1 are identified with corresponding reference characters. In this modification, a pair of driven discs 56 are illustrated as having splined connection with a hub member 57, the hub being disposed about and having a splined connection with the driven shaft 6. A pair of pressure plates 58 and 59 are associated with the driven discs 56, and are free to move axially but keyed against rotation relative to the flywheel by means of radially extending lugs 61 formed in the periphery of the pressure plates, and received in spaced slots 63 formed in the flywheel. A rearwardly extending hub 64 is formed integrally with the pressure plate 58 and is supported by a pair of bearings 65 rotatable on the driven shaft 6. The sliding collar 35 is journalled directly on the circumference of the hub 64.

As also shown in Figs. 5 and 6 of the drawings, a pair of resilient link members 66 are pivotally connected by means of pins 67 to each of the extending ears 34 of the sliding collar 35. The opposite ends of the resilient links support a pin 68 upon which three rollers 69, 70, and 71 are journalled. The rollers are disposed between the inclined ramp 24 associated with the adjustable collar 25 and the inclined face of a pressure shoe 72, rigidly secured to the rear face of the pressure plate 58. Engagement of the clutch is effected by urging the rollers between the inclined ramps in the manner previously described. However, in order to prevent a sliding action between the rollers and either of the inclined ramps, the rollers 69 and 71 are of a smaller diameter than the roller 70 so that only the roller 70 is in contact with the ramp 24. A relief 73 (Fig. 6) is formed in the shoe 72 providing adequate clearance so that the roller 70 does not contact the shoe. By virtue of this construction, the roller 70 is in contact only with the ramp 24 and the rollers 69 and 71 are in contact only with the inclined face of the shoe 72, thus permitting free rolling action as the rollers move across their respective inclined faces.

Disposed within each of the recesses 63 in the periphery of the flywheel is a counterweight 74. The counterweight is pivotally mounted on a pin 75 and is provided with an extending finger 76 which contacts the lug 61 formed in the periphery of the pressure plate 58. When the clutch is rotating the counterweights pivot about their supporting pins urging the clutch toward a disengaged position. The counterweights serve to retain the clutch in a disengaged position in opposition to the tendency that would be present in the links and rollers under centrifugal action to effect engagement of the clutch were the counterweights not used. The counterweights serve also to urge the pressure plate 58 out of frictional engagement with the driven discs 56 when the clutch is disengaged.

We claim:

1. In a friction disc type clutch, a pressure plate movable to engage the clutch, a surface inclined relative to the pressure plate, rollers disposed between said surface and the pressure plate, pivoted links supporting said rollers, and means to swing said links in a direction to move the rollers into a wedging position for advancing the pressure plate to a clutch engaging position, said links being arranged to assume an overcenter position relative to their pivotal support when the clutch is engaged and weights on said links tending to swing them under centrifugal action away from their clutch engaging position.

2. In a disc type clutch which includes a pressure plate for imparting clutch engaging pressure to the discs, a surface inclined relative to a surface on the pressure plate, rollers disposed between the relatively inclined surfaces, pivoted links supporting the rollers, means to swing said links for moving the rollers into a wedging position between said surfaces and into an overcenter position for engaging the clutch, and weights on said links for creating a centrifugal force tending to disengage the clutch but insufficient to dislodge the links from their overcenter position when the clutch discs are adjusted for required friction.

NORMAN E. RISK.
CHARLES A. RAMSEL.
RUSSELL C. WILLIAMS.

REFERENCES CITED

The following references are of record in the file of this patent:

UNITED STATES PATENTS

| Number | Name | Date |
|---|---|---|
| 834,499 | Sturtevant | Oct. 30, 1906 |
| 1,233,561 | Dorrfeld | July 17, 1917 |
| 1,272,745 | White | July 16, 1918 |
| 1,279,243 | Bruce et al. | Sept. 17, 1918 |
| 1,306,302 | Cooper | June 10, 1919 |
| 1,392,932 | Griffin | Oct. 11, 1921 |
| 1,553,101 | Osborn | Sept. 8, 1925 |
| 1,923,438 | Hughes | Aug. 22, 1933 |
| 2,033,835 | Lansing | Mar. 10, 1936 |
| 2,170,171 | Wemp | Aug. 22, 1939 |
| 2,185,714 | Scherer | Jan. 2, 1940 |